Patented Dec. 10, 1935

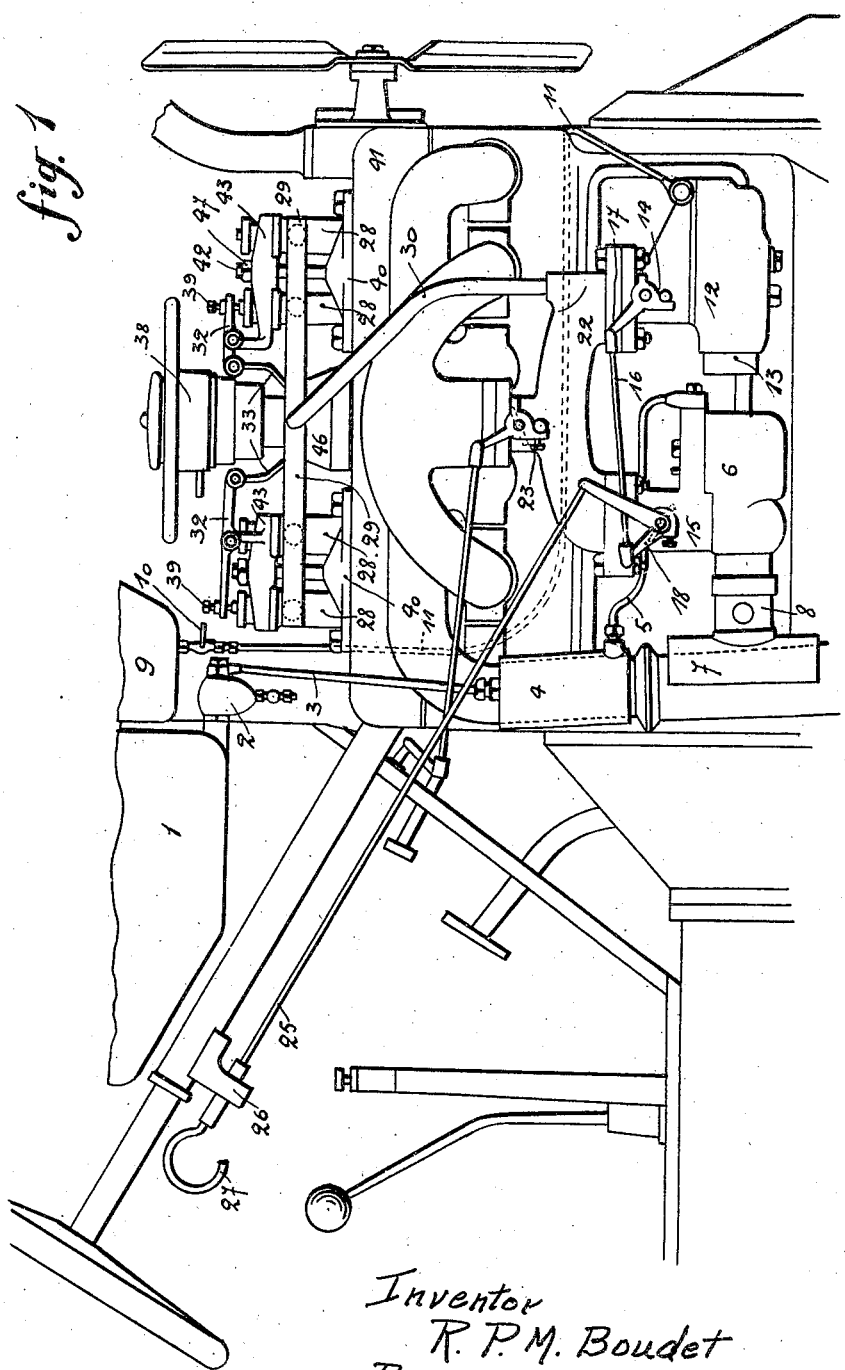

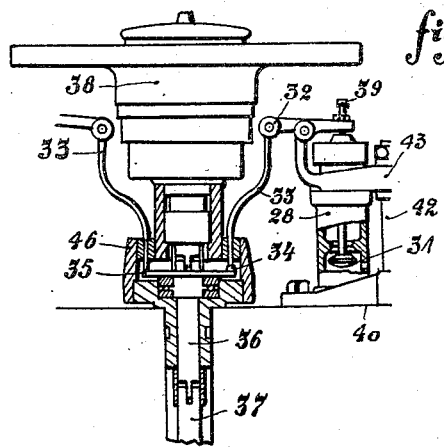
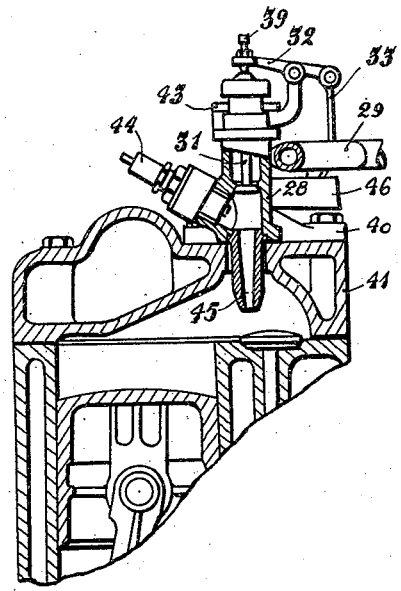
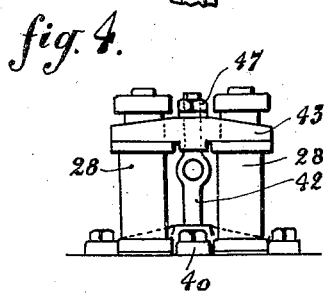
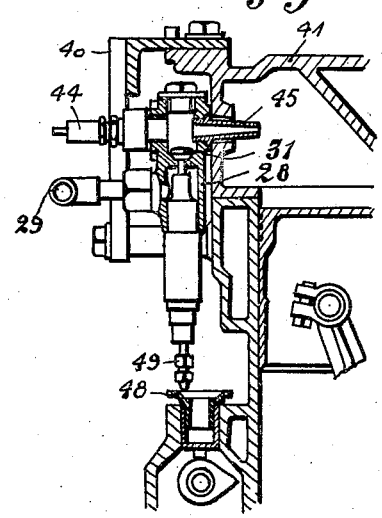
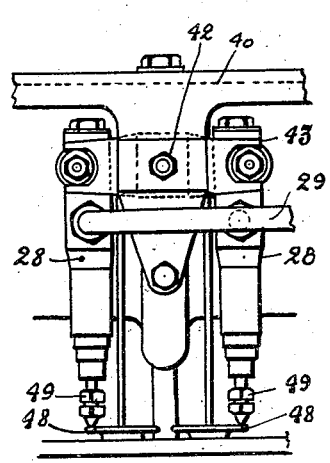

2,023,634

UNITED STATES PATENT OFFICE 2,023,634

BIFUEL INTERNAL COMBUSTION ENGINE

Raoul Pierre Marius Boudet, Cahuzac sur Vere, France

Application December 26, 1933, Serial No. 703,976
In France December 31, 1932

6 Claims. (Cl. 123—143)

This invention relates to the use of light fuels (petrol or the like) and heavy fuels (gas oil, heavy oil or the like) in internal combustion engines.

It has particularly for an object to ensure the regular ignition of the fuels, the instantaneous transfer from one fuel to the other or to a mixture of the two, and the satisfactory operation of the engines.

Heavy oil and the less volatile liquid combustibles, the utilization of which offers incontestable economic advantages, notably present the inconvenience of being difficult to ignite even when in the form of gaseous mixture with air. The spark of an ignition plug is insufficient to effect their regular ignition and complete combustion.

To obtain satisfactory operation and regular ignition of such mixtures, the present invention provides a process for feeding an internal combustion engine with light fuel (such as petrol) and heavy fuel (such as gas oil), characterized in that the ignition of the gaseous fuel-air-mixture admitted to the cylinder(s) is obtained by the ignition and explosion of a small quantity of a combustible volatile mixture, and in that the engine induction is in communication with a source of supply of the heavy fuel-air-mixture base and with a source of supply of the light fuel-air-mixture, the communication being such that by the interposition of control means the engine induces either the light fuel-air-mixture alone or the heavy fuel-air-mixture alone or the two mixtures simultaneously in any and instantaneously variable proportions.

Means for carrying out the invention may comprise one or more of the following arrangements:—

(a) Adapting to each cylinder an "ignition amplifier" comprising a small explosion chamber open to an admission valve and a sparking plug. The supplying of the amplifier with a rich mixture of air and petrol or the like is effected by the existing carburettor or by a special small carburettor. The body of the amplifier can be disposed on a spigot mounted in place of the sparking plug, the spigot being provided to conduct and direct the flame of the explosion in the amplifier towards the middle of the compression chamber and to oppose the entry of the gaseous fuel mixture from the compression chamber into the amplifier chamber.

(b) Utilizing, in combination with an amplifier as aforesaid, two carburettors, one a petrol carburettor, for the light fuel, which can feed the amplifier and the engine cylinders, the other for heavy fuel, feeding the cylinders only. The two carburettors are connected to the inlet manifold by a three-way conduit, provided in its outlet branch to the said manifold with a throttle regulating the induction and operated by the accelerator pedal or equivalent of the vehicle with which the engine is associated. The respective throttles of the two carburettors are coupled so that the one is closed when the other is open, and actuated simultaneously by a rod or other means in such manner as to enable induction instantaneously through the one or the other carburettor or through both in any and instantaneously variable proportions. With the engine operating on petrol, it suffices for the driver to operate a rod or a cable by hand to transfer from the light to the heavy fuel or vice versa, or to any desired combination. The outlet throttle of the three-way conduit to the inlet manifold can optionally be controlled by rod or other means, and the throttles of the two carburettors can be controlled simultaneously by the accelerator pedal or other means.

(c) Heating the heavy oil in a closed chamber in the absence of air, in a heater interposed in the conduit connecting the tank to the carburettor and receiving heat from the exhaust gas of the engine or from an electrical source, which also heats the carburettor and its air intake.

(d) Feeding a light mixture to the small chambers of the ignition amplifiers by a small special carburettor or by a branch from the petrol carburettor provided with a throttle or obturator coupled with the outlet throttle of the three-way conduit and actuated simultaneously therewith by the accelerator pedal or other means, or coupled with the throttles of the two carburettors and actuated simultaneously with them.

(e) Actuating the admission valves of the small chambers of the amplifier from the engine valve gear, or by a train of gears and cam shafts, or by a system of levers and thrust members, or by an electromagnetic, hydraulic, pneumatic or other arrangement.

(f) Disposing in the means for actuating each of the admission valves of the amplifier chambers an adjustable element in such manner as to permit regulation of the timing and the degree of opening of these valves.

(g) Attaching the ignition amplifiers in pairs to the engine by means of a single bolt for each pair, anchored in a stirrup fixed to the holding-down bolts of the head or of the engine, and pressing a cross-piece on the two ignition amplifiers, this cross-piece optionally supporting the means actuating the small admission valves, in such manner that the unscrewing of this one bolt enables removal of the two ignition amplifiers for inspection or repair, or for replacement of the sparking plug for running on petrol as prior to the application of the ignition apparatus.

The fulfilment of all these conditions ensures good operation with provision for easy supervision and dismantling.

The explosion flames are preferably conducted with all their pressure and all their heat to the desired point in the compression chamber of the engine to obtain regular ignition under the different operating conditions of the engine.

Preferably, also, the entry of the mixture of air and heavy oil into the amplifier explosion chambers is opposed, since it impoverishes the rich mixture and results in mis-firing.

The heavy fuel is conveniently reheated in a closed chamber, sheltered from air, prior to entering the carburettor. When it is heated in the presence of an excess of air, it decomposes and produces carbonizing, mis-firing, etc. From the fact that the ignition of the heavy fuel-air-mixture is obtained by the flame of the explosion in the amplifier, it is not necessary to heat it very strongly initially. When the heavy fuel is strongly heated, and the ignition is not very regular, as when it is desired to operate without an amplifier, the lubricating oil of the motor tends to be diluted, rendering the lubrication defective and possibly resulting in seizures.

To pass instantaneously from one fuel to the other and to cause their proportions to vary instantaneously, the induction of the carburetted gaseous mixtures is directly controlled at their entry into the inlet manifold.

On starting, operation is first effected with the mixture of air and petrol alone until the motor and the heavy oil are heated. After some minutes, the engine is operated on a mixture of air-petrol and air-heavy-fuel, then on a mixture of air and heavy fuel alone.

When, after a stoppage or for any other cause, the air-heavy-fuel mixture is not sufficiently hot, return is instantaneously made to the air-petrol mixture, then transferred progressively to the air-heavy-fuel mixture.

In known arrangements where there is only one carburettor for petrol and heavy oil it is necessary to use a certain quantity of one fuel before transferring to the other, with the result that picking-up is bad and carbonization may be caused.

A carburettor which is adjusted for petrol is incorrect for heavy oil and conversely, and a petrol carburettor must be rather cold while one for heavy oil must be heated.

The amplifier is fed with a rich mixture and adapted so that the ignition plugs are cooled, in order to obtain the most regular operation and the minimum of mis-firing.

The arrangements described permit regular operation on petrol and heavy fuel, for example gas oil, of an ordinary engine constructed for operating on petrol, and it is unnecessary to continue operation on petrol except on starting and to facilitate picking-up when the engine and the heavy oil are cold. Stalling at a critical moment is no longer to be feared when it is possible to return instantaneously and exclusively to the air-petrol mixture by simply operating a rod or other means within reach of the driver's hand.

With the amplifier, the volumetric consumption of fuel in operation with air-petrol and air-gas-oil is substantially the same as that of operation on air-petrol of an ordinary engine.

Other characteristics of the invention will be evident from the following description, solely by way of example, of its application to an existing four-cylinder petrol engine.

Referring to the accompanying drawings,

Fig. 1 is a view in elevation of an apparatus according to the invention,

Fig. 2 is a sectional view of the amplifier,

Fig. 3 is a view of the actuating means for the admission valves of the amplifier from the engine valve gear by means of an arrangement of the cams and levers disposed between the engine and the ignition interruptor and actuated by the interruptor shaft, Figs. 4 and 6 are views of arrangements for attaching pairs of amplifiers, located by spigots, by means of a single bolt anchored in a stirrup fixed to the cylinder head, and Fig 5 is a view of the actuating means for the admission valves of the amplifiers by the valve gear directly by means of the tappets of the admission valves of the engine.

The elevation (Fig. 1) shows the feeding of gas oil by the tank 1, previously utilized for petrol and now utilized for gas oil, the outlet tap 2 with a filter, a conduit 3 from the reservoir to a heater 4, a conduit 5 from the heater to a gas-oil carburettor 6, an air heater 7 for the said carburettor and a regulable air inlet 8, the petrol feed by a small tank 9, outlet tap 10 and conduit 11 from the tank to the petrol carburettor 12, having an adjustable air inlet 13.

Before starting, the taps 2 and 10 are opened, the petrol and the gas oil each feeding its respective carburettor.

The throttle 14 of the petrol carburettor 12 is connected to the throttle 15 of the gas-oil carburettor 6 by a rod 16 which joins the two throttle levers 17 and 18 in such a manner that one throttle is closed when the other is open. The two throttles 14 and 15 are actuated simultaneously by a rod 25 passing through a guide 26 and provided with a ring 27 located within reach of the driver. The two carburettors 6 and 12 are connected to the inlet manifold of the cylinders by a three-way conduit 22, the throttle 23 of which is actuated by the accelerator pedal.

The guide 26 carries a spring and a detent which maintain the rod 25 in its limiting positions upwards for operation on petrol and downwards for operation on gas oil, and in intermediate positions for operation on mixtures of the gases of the two fuels.

The ignition amplifier comprises four bodies 28, which are fed with air-petrol mixture by the manifold 29 and a conduit 30, which is branched from the petrol carburettor 12; the admission valves 31 (Fig. 2) of the chambers in the bodies 28 of the amplifier are controlled by levers 32 actuated through tappets 33 by a face-cam 34 on a disc 35 carried by a shaft 36 (Fig. 3) which is driven by a shaft 37 actuating the ignition interruptor 38 and itself actuated by the engine valve gear. The adjusting screws 39, secured by locknuts, permit the regulation at will of the opening of small admission valves 31 (Fig. 2) of the amplifiers.

Stirrups 40 fixed by the holding-down bolts of the head 41 maintain bolts 42, of which each secures two of the amplifier bodies 28 by means of a cross-piece 43, the latter also supporting the axes of oscillation of the levers 32.

Fig. 2 shows in section an amplifier body 28 with an admission valve 31, sparking plug 44 and spigot 45 screwed in place of the plug, penetrating deeply into the compression chamber of the engine, with a conical bore which directs and concentrates the jet of flame of the explosion on the desired point and opposes the entry of gases into the small explosion chamber by its interior section and its similarly conical exterior section.

Fig. 3 shows the arrangement for actuating the admission valves 31 of the amplifier bodies 28 by the levers 32, the tappets 33, the cam 34, the disc 35, the shaft 36 actuated by the shaft 37 of the drive to the interruptor 38; the tappets 33 are guided in a socket 46 which bears upon the motor head 41 and supports the interruptor 38, which is thus raised. It is only necessary to remove the socket 46 to replace the interruptor 38 in its original position.

Fig. 4 shows the securing in pairs of the amplifier bodies 28 by means of the cross piece 43 on the bolt 42, and the stirrup 40. Removal of the nut 47 enables removal of the amplifier bodies 28 and replacement of the plugs 44 in their original positions if desired.

The application of the process and apparatus according to the invention to a motor arranged like the Chevrolet is shown in Figs. 5 and 6.

Fig. 5 discloses an arrangement for direct operation of the small ignition valves 31 of the amplifier bodies 28 by tappets 48 actuated by the valve gear of the engine, adjustment being provided by screws 49.

Fig. 6 shows a mode of attachment in pairs of the amplifier bodies 28 illustrated in Fig. 5, by means of cross-piece 43 on bolt 42, and a stirrup 40. Removal of the nut 47 enables removal of the bodies 28.

What I claim is:—

1. System for feeding an internal combustion engine with light fuel, such as petrol, and heavy fuel, such as gas oil, comprising means for heating by the exhaust gas of the engine the heavy fuel before its transformation into fuel-air-mixture, a small explosion chamber forming an ignition amplifier and fed through an admission valve with a gaseous volatile mixture, a spark plug for said chamber, a conduit serving to direct into the engine cylinder the ignited jet, a communication between the main induction valve of the engine and simultaneously with a source of supply of the heavy fuel-air-mixture and with a source of light fuel-air-mixture, and means for controlling the proportion of light and heavy fuel-air-mixtures induced through the main valve, said means being such that the engine induces either the light fuel-air-mixture alone or the heavy fuel-air-mixture alone or the two mixtures simultaneously in any and instantaneously variable proportions.

2. System for feeding an internal combustion engine with light fuel, such as petrol, and heavy fuel, such as gas oil, comprising means for heating by the exhaust gas of the engine the heavy fuel before its transformation into fuel-air-mixture, a small explosion chamber forming an ignition amplifier and fed through an admission valve with a gaseous volatile mixture, a spark plug for said chamber, a conduit serving to direct into the engine cylinder the ignited jet, two separate carburettors for feeding the engine with light fuel-air-mixture and heavy fuel-air-mixture, the two carburettors being connected to the cylinder inlet manifold by a three-way conduit provided in its outlet branch with a throttle for controlling the induction, the respective throttles of the two carburettors being coupled so that the one is closed when the other is open and being actuable simultaneously so as to permit induction instantaneously through one or the other carburettor, or through both carburettors in any and instantaneously variable proportions.

3. A system according to claim 1 wherein means for actuating the admission valve of the amplifier comprises an adjustable system in operative combination with a removable element interposable in the drive to the ignition interrupter of an engine.

4. A system according to claim 1 wherein the admission valve actuating means comprise elements adjustable to permit the timing and degree of opening of the valve to be varied.

5. An internal combustion engine comprising a system according to claim 1 wherein a plurality of ignition amplifiers are attached in pairs by means of single bolts each anchored in a stirrup secured by the holding-down bolts of the cylinder block, the said bolt pressing a cross-piece upon the two ignition amplifiers.

6. An internal combustion engine comprising a system according to claim 1 wherein a plurality of ignition amplifiers are attached in pairs by means of single bolts each anchored in a stirrup secured by the holding-down bolts of the cylinder block, the said bolt pressing a cross-piece upon the two ignition amplifiers, means for supporting by the cross-piece the member of the admission valve actuating means.

RAOUL PIERRE MARIUS BOUDET.